(12) United States Patent
Rinkewich

(10) Patent No.: US 6,497,143 B1
(45) Date of Patent: Dec. 24, 2002

(54) CONTAINER WITH AUTOMATICALLY CONTROLLED DISCHARGE FOR CONTINUOUS METERING OF LIQUID FLOW

(76) Inventor: Isaac Rinkewich, 4822 Garden View Terrace, Hightstown, NJ (US) 08520

(*) Notice: Subject to any disclaimer, the term of this patent is extended or adjusted under 35 U.S.C. 154(b) by 37 days.

(21) Appl. No.: 09/617,727

(22) Filed: Jul. 17, 2000

(51) Int. Cl.$^7$ ................................................. A01J 9/06
(52) U.S. Cl. .................... 73/224; 73/305; 73/861.57; 137/395; 137/409
(58) Field of Search ................................ 73/224, 223, 305, 73/299, 861.57, 1.73, 861.42, 861.52, 861.53; 137/423, 397, 398, 409, 413, 434, 449, 391, 395

(56) References Cited

U.S. PATENT DOCUMENTS

| 4,173,892 A | 11/1979 | Khurgin |
| 4,336,825 A | * 6/1982 | Pion ............................ 137/403 |
| 4,433,577 A | * 2/1984 | Khurgin et al. ........... 119/14.17 |
| 5,715,856 A | * 2/1998 | Martin et al. ............. 119/14.34 |
| 5,901,740 A | * 5/1999 | Sanchelima ................. 137/392 |

* cited by examiner

Primary Examiner—Harshad Patel
Assistant Examiner—Corey D. Mack
(74) Attorney, Agent, or Firm—Robert L. Epstein; Harold James; James & Franklin, LLP

(57) ABSTRACT

Liquid, such as milk, enters the sealed container from an inlet at the top of the container and exits through an outlet at the bottom of the container. The quantity of liquid in the container is sensed and a microprocessor calculates the total volume of liquid. During periods of low flow, such as at the beginning and at the end of the milking cycle, the outlet is automatically closed, partially or completely, by a motorized valve connected to the microprocessor, or by a weighted float situated within the container, so as to accumulate the liquid during those periods thereby enhancing the accuracy of the measurement.

16 Claims, 5 Drawing Sheets

CONTAINER WITH AUTOMATICALLY CONTROLLED DISCHARGE FOR CONTINUOUS METERING OF LIQUID FLOW

The present invention relates to apparatus for measuring liquid flow on a continuous "flow-through" basis, and more particularly, to a container of unique design which permits accurate measurement during the low flow rate periods, such as at the beginning and at the end of the flow cycle.

The invention is particularly well suited for the measurement of milk yield of individual cows in a dairy farm. It can be used in conjunction with automatic milking machines of conventional design.

At one time, milk yields from individual cows were measured only on an occasional basis because taking accurate measurements is time consuming and requires additional equipment, as well as skilled personnel to operate the equipment. However, the daily measurement and recording of the milk yield for each cow in a herd can enhance the overall milk production significantly. Monitoring daily milk yield facilitates, among other things, efficient culling (selling of inefficient milk producers for beef), feed allocation on a selected basis (group or individual) and calved cows problems (including due date). Further, it is useful in detecting cows in heat, mastitis and other health problems.

The data obtained from daily measurement of milk yield enables the owner of the herd to detect problems quickly and to react to them by taking the necessary steps to maintain the optimum milk yield for each animal, either by altering the feed mix, administering medication, or the like. In spite of the usefulness of this data, to be practical, measurements must be capable of being made without imposing additional work load on the personnel, who are already fully occupied by caring for the livestock.

Apparatus for the measurement of quantities of liquid, such as milk, on a batch basis, are known. One example of such apparatus is disclosed in U.S. Pat. No. 4,173,892, entitled "Apparatus For Measurement of Quantity of Liquid in Container" issued on Nov. 13, 1979 to Boris Khurgin. That apparatus is designed to generate an electrical signal proportioned to the total milk volume in a container of glass or similar non-conducting material. The container is provided, on its exterior surface, with a pair of spaced, opposed electrodes which operate like the plates of a capacitor, with the container and its contents acting as a dielectric. The capacitance of the container is sensed and a representative electrical signal is generated which can be used to calculate the total volume of the liquid in the container.

The apparatus of the above mentioned patent has been found to produce very accurate results. However, its use requires considerable extra work and time on the part of the dairy personnel because it is a batch-type process, where measurement can be made only after all of the milk from the cow is in the container.

Metering flow during milking is not possible with the batch type capacitance measuring system because liquid flowing into the container, and thus between the capacitor surfaces, interferes with the accurate measurement of the capacitance which is a result of the liquid in the container. Moreover, such containers, because of their dimensions, require containers which are relatively tall.

In order to reduce the time and effort associated with making accurate measurements of daily milk yields for each cow, a flow-through liquid measuring apparatus was developed. That apparatus, in its simplest form, comprises two concentric vertical tubes. The exterior surface of each tube is provided with a metallic coating which acts as an electrode. Each electrode is electrically isolated from the other, so as to form a capacitor. The inner of the two concentric tubes is connected at its upper end to a pipe conveying milk through an orifice. The size of the orifice is selected to maintain the liquid level in the tube above a restriction of known dimension, as long as milk flows through the apparatus. The inner tube and the outer tube communicate through openings in the inner tube wall adjacent the restriction, causing the liquid to rise to the same level in both tubes.

The capacitance between the plates changes in proportion to the liquid level in the space between the concentric tubes. The two electrodes are connected to an electronic circuit which generates a voltage output proportional to the capacitance. The milk level in the apparatus changes in proportion to the square of the milk flow rate through the restriction. The electronic circuit is designed to take the square root of the voltage output, in order to obtain a signal which is proportional to milk flow rate. This function is then integrated over the interval of time for the milking operation, so as to obtain the total milk yield.

For health reasons, milking machines and associated hardware designed to handle the flow of milk, must be capable of being sanitized and completely cleaned of all milk residue at regular intervals. Any equipment, such as that which measures the flow of milk, must also have this capability, so as to prevent contamination. Aside from high initial cost, one significant drawback of the double tube design is the difficulty inherent in keeping the apparatus clean and sterile.

Another drawback, which is common to all types of apparatus employing opposed capacitor surfaces separated by a liquid, is that milk, or any other liquid, when it is receding, forms a thin layer or coating which remains on the interior tube walls for a certain period of time. This residue causes the instruments to falsely detect a higher capacitance than which corresponds to the actual milk level. Although this error is relatively small, it nevertheless causes inaccurate final results of the milk yield and, thus, this type of apparatus may not be suitable in cases where extremely accurate results are required.

On Feb. 28, 1984, U.S. Pat. No. 4,433,577 entitled "Apparatus For Metering Liquid Flow" issued to Khurgin et al. That patent discloses apparatus for continuously measuring the rate of flow of a liquid from a source which overcomes the disadvantages of the flow-through capacitance type measuring system. The apparatus includes a container with an inlet tube connected to the liquid source. The container has an inlet port, connected to the inlet tube, through which liquid is supplied to the container. An orifice is situated at the bottom of the container to permit liquid to drain from the container at a known rate. An outlet tube is connected to the orifice. A conduit is provided to connect the container, at a point above the liquid therein, and the outlet tube, for equalizing the pressure therebetween. Means are provided for sensing the liquid level in the container and for generating a signal representative of the instantaneous rate of liquid flow through the container, in accordance with the sensed liquid level.

A bypass conduit connects the container and the outlet tube. This conduit permits liquid situated above a given level in the container to bypass the orifice and flow directly into the outlet tube. The pressure equalizing conduit and the bypass conduit may be embodied in a single conduit connecting the upper portion of the container and the outlet tube.

The apparatus is designed for use in conjunction with suction means which form a portion of an automatic milking machine. When so used, the suction means and the inlet tube are connected, such that milk is drawn through the tube and into the container by the suction action of the machine.

The signal generating means disclosed in the patent includes means for detecting the level of the liquid surface in the container, means for generating an analog signal representative of the detected surface level, and means for converting the analog signal into a digital signal representative of the liquid flow rate. Means are provided for integrating the digital signal over a given time period and for generating a signal representative of the total liquid volume flow through the container, during the time period.

One category of detecting means described in the patent is a plurality or array of sensors situated along the vertical surface of the container. Each of the sensors generates an output which represents the presence or absence of liquid adjacent to its location.

In order to produce results which are relatively accurate, the apparatus of the patent must employ a small round drain orifice. The orifice must have a relatively small diameter in order to maintain sufficient liquid level during low flow rate conditions. Because the orifice must be small, under higher flow conditions, the liquid tends to back up, accumulating in the container. Consequently, a very large volume (24 inches high, 12 inches in diameter) cylindrical container is required. If, on the other hand, a more reasonable sized container was used, a larger orifice would be required and the apparatus would not function accurately under conditions of low flow.

Thus, when used to meter milk, the patented apparatus does not function accurately at the very beginning and at the end of the milking operation, which are low flow rate periods, unless a very small orifice and a large volume container are used. In the U.S. Pat. No. 6,324,906 issued Dec. 4, 2001, this drawback is overcome by utilizing a double chamber container and substituting an elongated flow passage with a larger flow area for the small round orifice of the patented device, thereby eliminating the need for a very large volume container.

The liquid flow metering apparatus disclosed in the above application includes a liquid container having opposing side walls and a floor. A partition divides the container into first and second chambers. An inlet port is provided in the first chamber connected to the liquid source. An outlet port is provided in the second chamber connected to a drain conduit. Means are provided for sensing the quantity of liquid in the first chamber and for calculating the total liquid volume by integrating the sensed liquid quantity over time. The partition has a flow passage slot. The slot includes an elongated portion extending from the container floor, in a direction generally parallel to the side walls.

The cross-sectional area of the elongated slot portion is approximately the same as the cross-sectional area of the inlet port. The elongated slot portion is defined between spaced edges of the partition. In one preferred embodiment, the elongated slot portion is substantially rectangular. In another preferred embodiment, the elongated slot portion has a gradually increasing width.

The slot also has a portion which extends in a direction generally perpendicular to the elongated slot portion. The purpose of this slot portion is to provide an overflow passage between the chambers. Hence, the slot portions together form a "T" shape.

The present invention takes a somewhat different approach to this challenge of keeping the overall dimensions of the container very small and very low. It employs a single chamber container with a circular liquid drain or outlet, similar to the chamber and orifice of U.S. Pat. No. 4,433,577. However, the outlet is larger and has associated with it a means for automatically controlling the liquid flow through the outlet, in accordance with the quantity of liquid in the container.

An average milking time flow cycle for an individual cow is, for illustration purposes, approximately 8 minutes. During the first minute and the last minute of the milking cycle (25% of the total) the milk flow rate is low, resulting in yield of only about 10% of the total. If an error occurs in measuring during this low flow rate period, this error will contribute significantly to an overall error in the total yield calculation. The present invention significantly reduces errors resulting from the low flow rate periods of the milking cycle by allowing full flow through the large drain orifice only after accumulation of liquid in the container obtained during the low flow rate periods.

The present invention accomplishes this by automatically controlling the discharge through the drain outlet. By closing the drain orifice when the flow rate from the cow is low, such as at the beginning and at the end of the milking time flow cycle, milk obtained during those periods is accumulated in the container and can consequently when it flows freely through the large orifice be measured accurately.

When the liquid in the container accumulates so as to reach a predetermined level, for example, between a quarter and a half of the container vertical height, the discharge outlet is opened. In one embodiment of the invention, this is accomplished by a motorized valve situated in the outlet. The valve is controlled by a microprocessor connected to a liquid quantity sensor. The valve is opened to permit a full flow through the round drain outlet. However, when the liquid level recedes below a predetermined level, for example to a quarter or less of the container vertical height, the valve is closed, allowing the liquid to accumulate and causing the flow count to stop.

Whenever the valve opens, and full flow starts, the microprocessor must add to the current flow quantity an amount representative of the quantity of liquid which has accumulated between the top surface of the orifice entrance and the top of the valve. This correction enhances the accuracy of the metering.

When the drain outlet is closed and the microprocessor detects that there has been no change in liquid level for a given period, for example, three minutes, indicating the end of the milking cycle, the valve will open automatically, even though the liquid level has not reached the predetermined liquid level. When the valve opens at the end of the cycle, the flow metering will start again, so as to take into account the accumulated quantity at the end of the cycle.

Sensing of the quantity of the liquid in the container can be accomplished by any of the level sensors disclosed in U.S. Pat. No. 4,433,577, including electronic pressure sensors, electronic optical sensors, vertically spaced electrical resistance or capacitance sensors, infra-red sensors and electronic sonic sensors. Alternatively, a differential pressure sensor or a weight sensor can be used.

It is, therefore, a prime object of the present invention to provide a continuous flow-through liquid metering apparatus capable of accurate measurement throughout the flow cycle, including the low flow rate periods.

It is another object of the present invention to provide a continuous flow-through liquid metering apparatus with automatically controlled liquid discharge.

It is another object of the present invention to provide a continuous flow through liquid metering apparatus which utilizes a microprocessor controlled motorized valve to control discharge.

It is still another object of the present invention to provide a continuous flow through liquid metering apparatus which utilizes a weighted float to control discharge.

In accordance with the present invention, apparatus is provided for metering liquid flow. The apparatus includes a sealed liquid container having a liquid inlet proximate the top and liquid outlet proximate the bottom such that liquid from the inlet normally flows through the container and out the liquid outlet. Means are provided for sensing the quantity of liquid in the container and for calculating the total liquid flow. Means are also provided for automatically controlling liquid discharge through the outlet in accordance with the quantity of liquid in the container.

The discharge control means comprises valve means associated with the outlet. Means are provided for regulating the valve means in accordance with the quantity of liquid in the container.

The sensing means may take the form of differential pressure sensor. In that case, first and second conduits operably connect the differential pressure sensor with the top and the bottom of the container, respectively. The second conduit preferably includes an inclined section.

The sensing means may also take the form of a liquid level sensor or a liquid weight sensor.

The calculating means includes a microprocessor having an input operably connected to the sensing means. The microprocessor receives signals from the sensors. It integrates these signals over time to obtain a measurement of the total volume obtained from each cow. The valve regulating means opens and closes the valve in accordance with the liquid quantity sensed by the sensors.

In one preferred embodiment, the valve means takes the form of a ball valve with a moveable control arm. The valve regulating means includes a motor with an output shaft. Means are provided for operably connecting the motor output shaft and the valve control arm.

In another preferred embodiment, the discharge control means comprises a weighted float. The float has a first portion adapted to substantially block the discharge outlet when the liquid in the container falls below a predetermined quantity. The float has a second portion which cooperates with the interior wall of the container to maintain the first float portion in alignment with the outlet. The second float portion preferably comprises three radially extending elements.

Means for connecting the container, at a point on the container above the liquid, and the liquid outlet, are provided. This means serves to equalize the pressure between the upper portion of the container and the outlet.

To these and such other objects which may hereinafter appear, the present invention relates to a container with automatically controlled discharge for continuous metering of liquid flow, as described in detail in the following specification, recited in the annexed claims, and illustrated in the accompanying drawings, in which like numerals refer to like parts, and in which:

Figure 1:
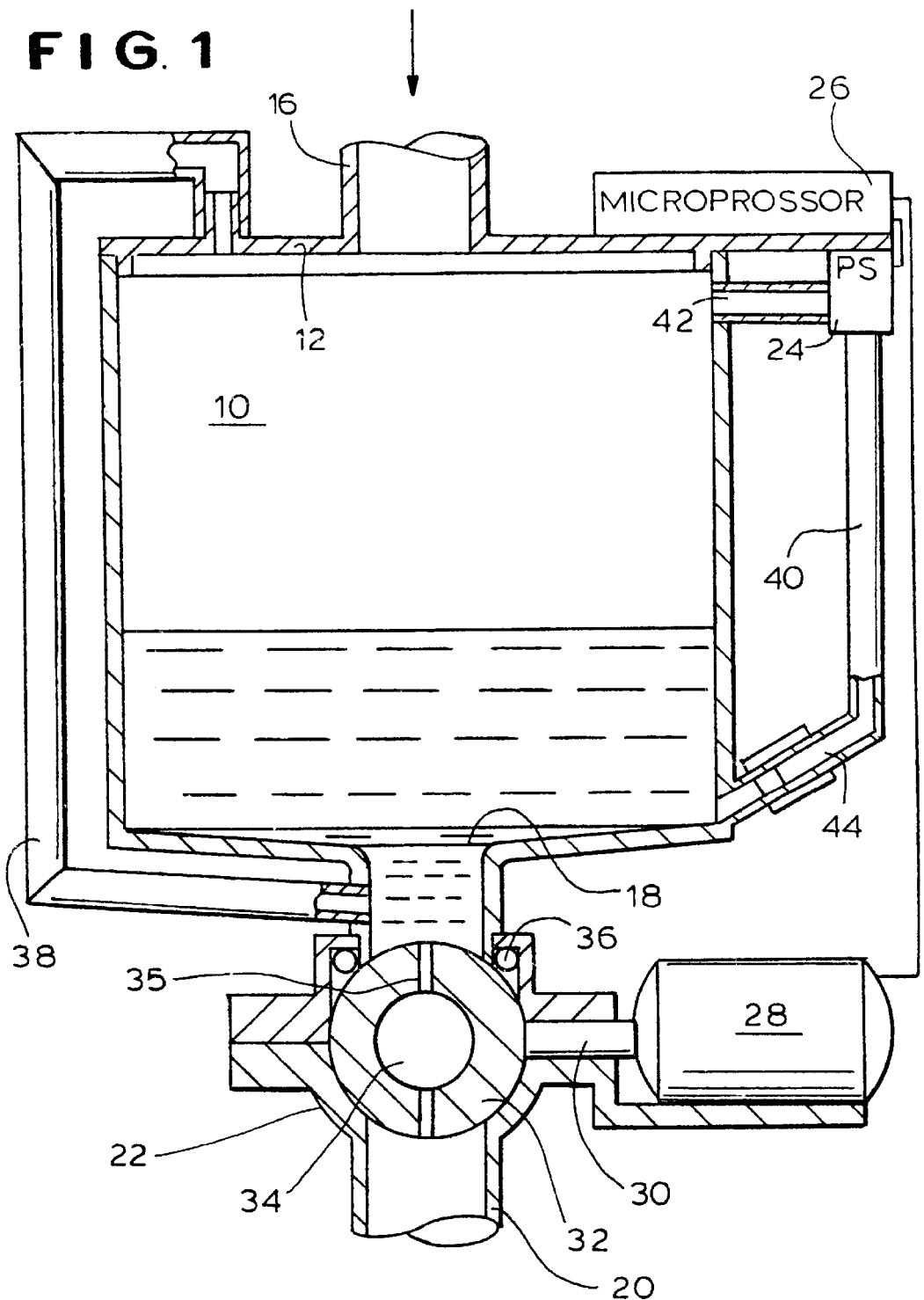
FIG. 1 is a cross-sectional view of a first preferred embodiment of the present invention, showing the container with the valve closed.
Figure 2:
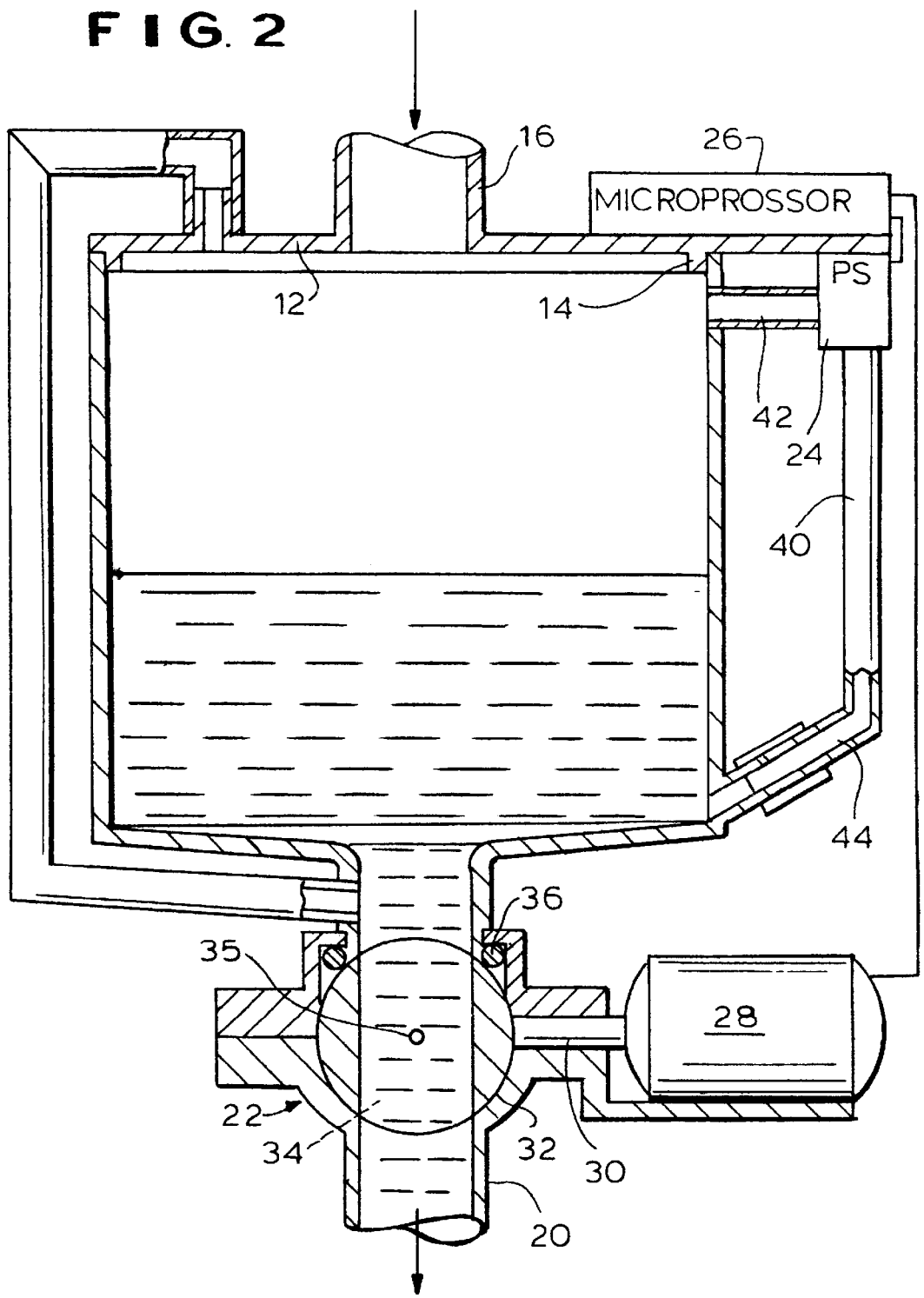
FIG. 2 is a view similar to FIG. 1, showing the valve open.

As seen in FIGS. 1 and 2, the cylindrical container 10 of the present invention has a cover 12 with a location rim 14. Cover 12 is hermetically sealed to the top edge of the cylindrical container wall. An inlet tube 16 allows liquid to flow into container 10. The liquid is discharged at the bottom of the container through a round orifice 18 of known dimension which forms the mouth of outlet tube 20.

A ball valve 22 is located in outlet tube 20. Valve 22 is regulated by a motor 28 which opens and closes the valve to control the discharge from the container.

The quantity of liquid in container 10 at any given time is sensed in this preferred embodiment by a differential pressure sensor 24 which is connected to a microprocessor 26. One output of microprocessor 26 is connected to energize electric motor 28. Motor 28, when energized, rotates its shaft 30 one quarter turn (90 degrees) to rotate ball 32 from its closed position (FIG. 1) to its open position (FIG. 2), aligning passage 34 with outlet tube 20 to facilitate full flow.

This sequence takes place whenever the liquid reaches a predetermined level, for example, between a quarter to a half of the container height. On the other hand, whenever the liquid falls below the predetermined level, for example, a quarter or less of the container height, the output of sensor 24 causes microprocessor 26 to energize motor 28 to turn shaft 30 one quarter turn thereby causing ball 32 to rotate to a closed position where passage 34 is perpendicular to the outlet tube 20, blocking discharge, as shown in FIG. 1. When the valve is in the closed position, the microprocessor stops metering the liquid flow. An "O" ring seal 36 is utilized to seal the ball 32 against leaks.

A pressure equalization and overflow tube 38 is provided. Tube 38 serves to equalize the positive or negative pressure between the top of container 10 and the outlet tube 20.

The differential pressure sensor 24 is connected to the bottom of container 10 by tube 40 and to the top of container 10 by tube 42. Tube 40 has a lower section 44 which is inclined. An air bubble will accumulate in section 44 to protect sensor 24 from corrosive elements. Furthermore, the inclined section 44 facilitates drainage of tube 40, after each cleaning cycle.

In operation, inlet tube 16 is connected to a source of liquid, such as milk, which flows into the hermetically sealed container. At the beginning of the milking cycle, the valve is in the closed position as shown in FIG. 1. When the milk in the container reaches a predetermined quantity, valve 22 automatically opens and liquid metering starts. The microprocessor compensates for the milk in the outlet tube, above the valve, which would otherwise not be taken into account. Metering of milk flow continues until the quantity of milk in the container falls below a predetermined quantity.

When the quantity of milk falls below a predetermined level, valve 22 is automatically closed. Whenever this occurs, metering stops.

At the end of the flow cycle, when the valve is closed and the microprocessor detects no additional flow for a predetermined period, such as three minutes, the microprocessor causes valve 22 to open for the last time. Liquid metering resumes until the liquid sensor indicates that no liquid remains in the container. To the metered quantity, a predetermined fixed quantity is again added to account for the milk in tube 20, above the valve.

Sometimes it may be preferable not to close the outlet tube completely but to instead permit slow flow through the tube even when the valve is closed. In this event, a small channel 35, transverse to passage 34 in ball valve 32, may be utilized for this purpose. Channel 35 is illustrated in FIGS. 1 and 2. It has a diameter which is substantially much smaller than the diameter of passage 34.

Figure 3:
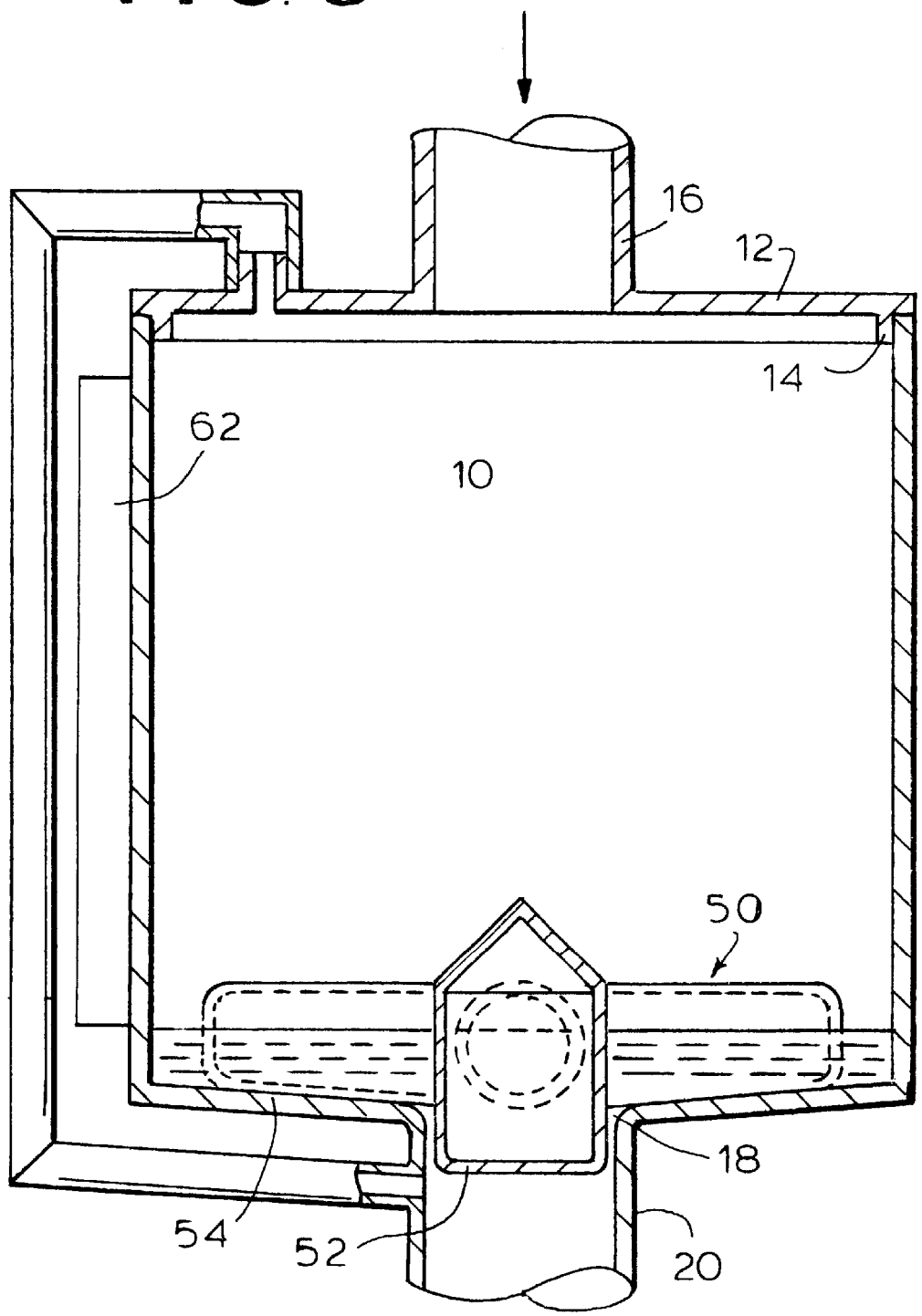
FIG. 3 is a cross-sectional view of a second embodiment of the present invention, showing the container with the float in the blocking position.
Figure 4:
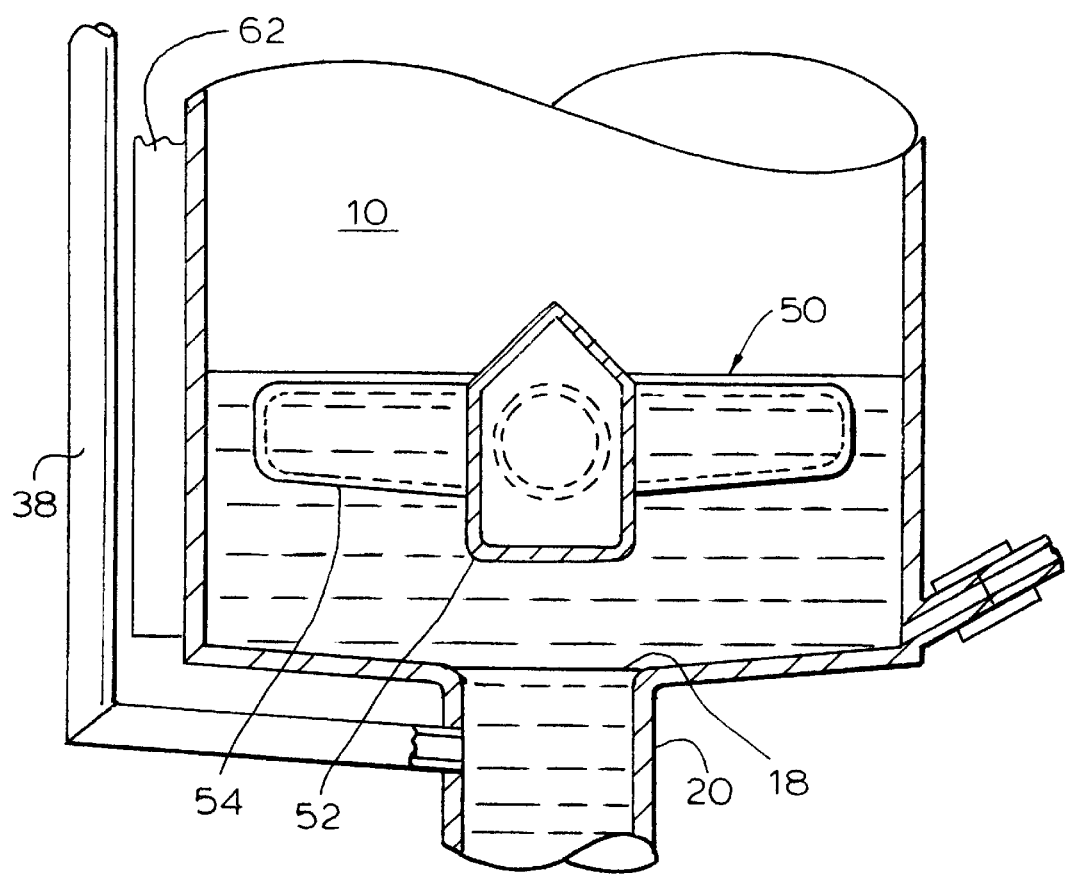
FIG. 4 is a view similar to FIG. 3, showing the float in the non-blocking position.
Figure 5:
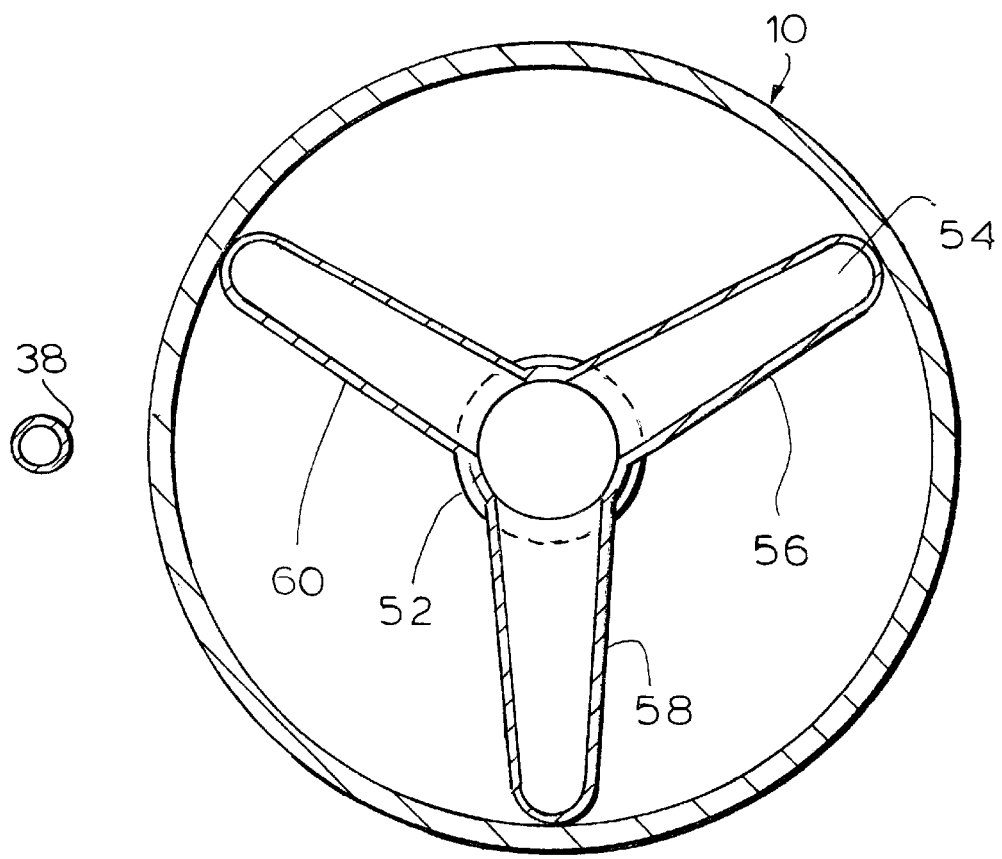
FIG. 5 is a cross-sectional view of the float taken along line 5—5 of FIG. 3.

The second preferred embodiment of the invention is illustrated in FIGS. 3, 4 and 5. In this embodiment, motor 28 and valve 22 are replaced by a weighted float 50 which includes a first portion 52 and a second portion 54. Float 50 is weighted such that it normally floats immediately below the surface of the liquid in container 10.

When the liquid in container 10 is above a given level, float portion 52 is spaced from orifice 18 of outlet tube 20 and discharge flow is unobstructed, as seen in FIG. 4. However, as the liquid level falls below that level, float 50 descends to the bottom of the container and portion 52 completely or partially plugs the mouth of outlet tube 20, preventing discharge completely or allowing slow discharge, as seen in FIG. 3. The liquid in the container will accumulate until float 50 moves out of the outlet tube.

As shown in FIG. 3, the outer diameter of float portion 52 is preferably slightly smaller than the inner diameter of outlet tube 20 in order to permit the float to move into and out of orifice 18 freely and to permit a slow flow of milk from the container even when the float is in its lowest position. This configuration permits the milk accumulated at the end of the milking cycle to drain.

As seen in FIG. 5, portion 54 of float 50 preferably consists of three radially extending hollow elements 56, 58 and 60. The ends of elements 55, 58 and 60 cooperate with the interior wall of the round container to maintain float portion 52 in alignment with outlet tube 20. However, the container and hence the float may have other configurations, such as square or rectangular.

The second preferred embodiment utilizes a plurality of electrical, optical or other types of liquid level sensors. The sensors are connected to the microprocessor. The sensors and microprocessor are shown as block 62. This eliminates the need for differential pressure sensor 24 and tubes 42 and 44.

While only a limited number of preferred embodiments of the present invention have been disclosed for purposes of illustration, it should be obvious that many variations and modifications could be made thereto. For example, different valve configurations could be substituted for ball valve 22. Different valve regulators could be employed instead of motor 28, such as a solenoid. Different types of liquid quantity sensors could be used. It is intended to cover all of these variations and modifications, which fall within the scope of the present invention, as defined by the following claims:

I claim:

1. Apparatus for metering liquid flow comprising a sealed liquid container having an inlet proximate the top and an outlet proximate the bottom, such that liquid from said inlet flows through the container and is discharged from said outlet, a discharge tube connected below said outlet, pressure equalization means comprising a tube connecting a point on said container above the surface of the liquid and said discharge tube, means for sensing the quantity of liquid in said container, means for calculating the total liquid flow through said container and means for automatically reducing the size of said outlet in accordance with the quantity of liquid in said container.

2. The apparatus of claim 1 wherein said outlet size reducing means comprises valve means associated with said outlet and means for regulating said valve means.

3. The apparatus of claim 1 wherein said sensing means comprises a liquid level sensor.

4. The apparatus of claim 1 wherein said sensing means comprises an optical sensor.

5. The apparatus of claim 1 wherein said calculating means comprises a microprocessor operably connected to said sensing means.

6. The apparatus of claim 5 wherein said microprocessor comprises an output, said outlet size reducing means comprises valve means associated with said outlet and further comprising means for regulating said valve means in accordance with said output of said microprocessor.

7. The apparatus of claim 6 wherein said valve means comprises a ball valve with a moveable control arm.

8. The apparatus of claim 7 wherein said valve regulating means comprises a motor with an output shaft and means for operably connecting said motor output shaft and said valve control arm.

9. The apparatus of claim 7 further comprising a drain passage through said ball valve and a channel directed substantially perpendicular to said drain passage, said channel having a much smaller diameter than said passage.

10. The apparatus of claim 1 wherein said outlet size reducing means comprises a weighted float, said float comprising a first portion received in said liquid outlet when the liquid in said container falls below a predetermined level.

11. The apparatus of claim 10 wherein said float comprises a second portion for maintaining said first float portion in alignment with said outlet.

12. The apparatus of claim 11 wherein said container has an interior wall and wherein said second float portion cooperates with said interior container wall to maintain said first float portion in alignment with said liquid outlet.

13. The apparatus of claim 11 wherein said second float portion comprises three radially extending elements.

14. The apparatus of claim 10 wherein said liquid outlet has a given diameter and said first float portion has a diameter slightly smaller than said given diameter.

15. Apparatus for metering liquid flow comprising a sealed liquid container having an inlet proximate the top and an outlet proximate the bottom, such that liquid from said inlet flows through the container and is discharged from said outlet, a first conduit connected to a point on said container above the surface of the liquid, a second conduit connected to a point on said container below the surface of the liquid, differential sensor means connected between said first and second conduits for sensing the quantity of liquid in said container, means connected to said sensor means for calculating the total liquid flow through said container and means for automatically reducing the size of said outlet in accordance with the quantity of liquid in said container.

16. The apparatus of claim 15 wherein said second conduit comprises an inclined section.

\* \* \* \* \*